Figure 11:
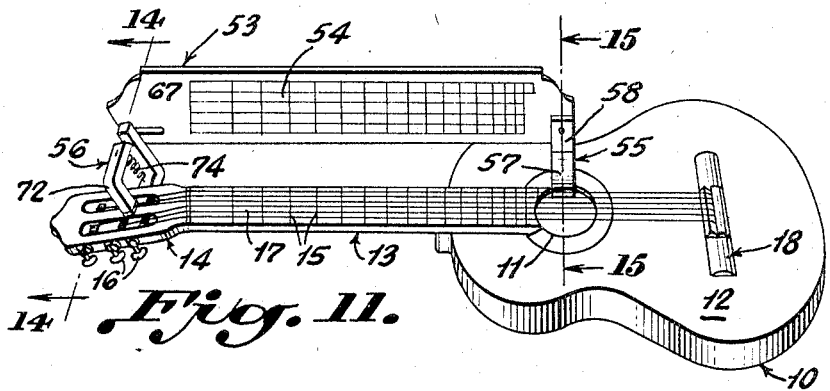

April 23, 1968          R. D. FOX          3,379,088
VISUAL NOTE INDICATOR FOR STRINGED INSTRUMENTS
Filed Aug. 19, 1965          4 Sheets-Sheet 1
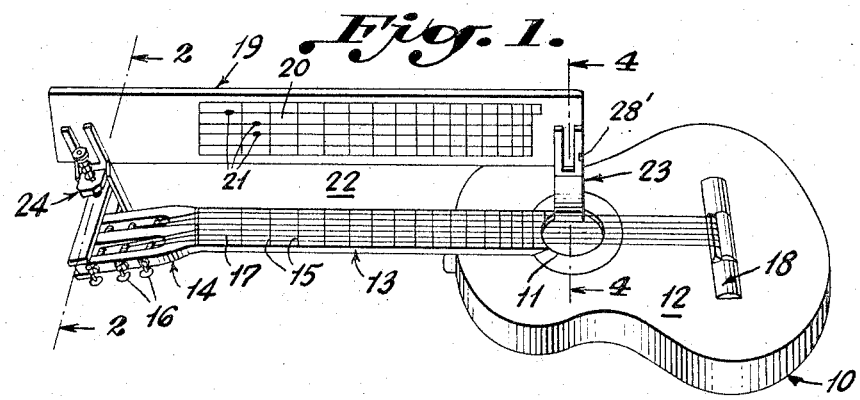
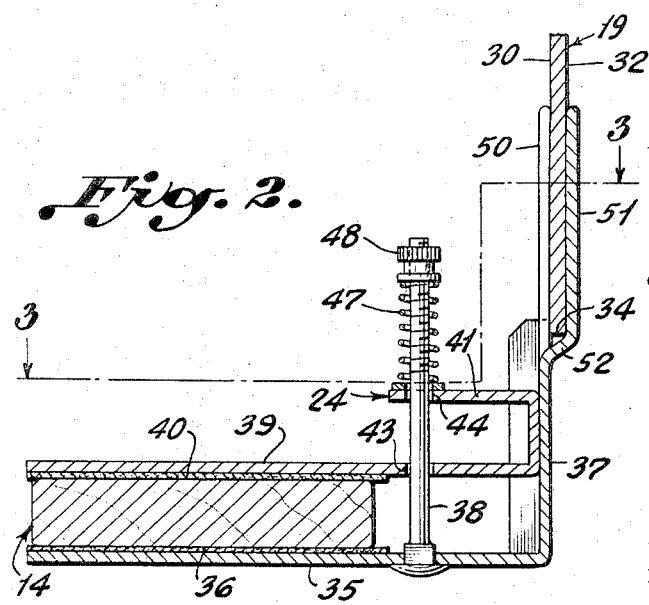
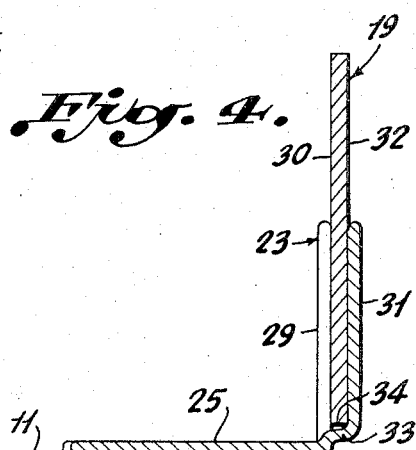
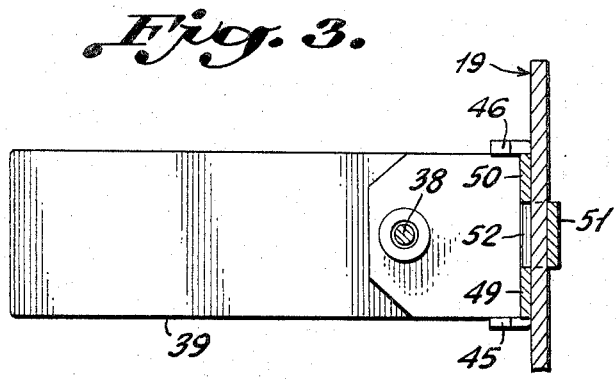
INVENTOR
RIPLEY D. FOX
BY Almon S. Nelson
ATTORNEY

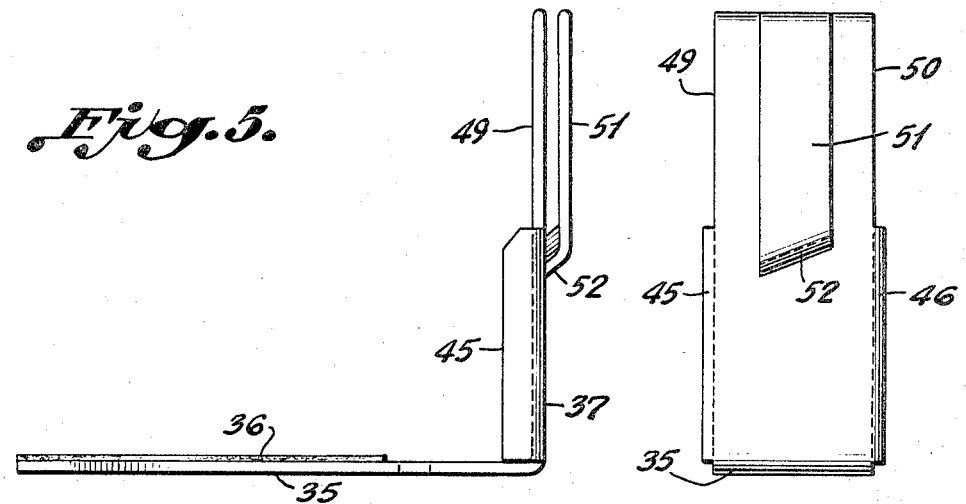
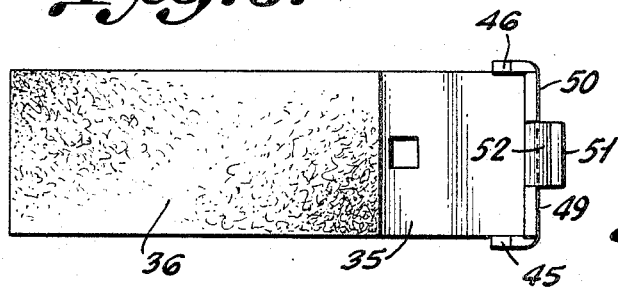
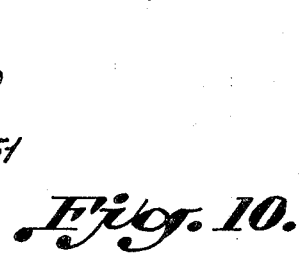
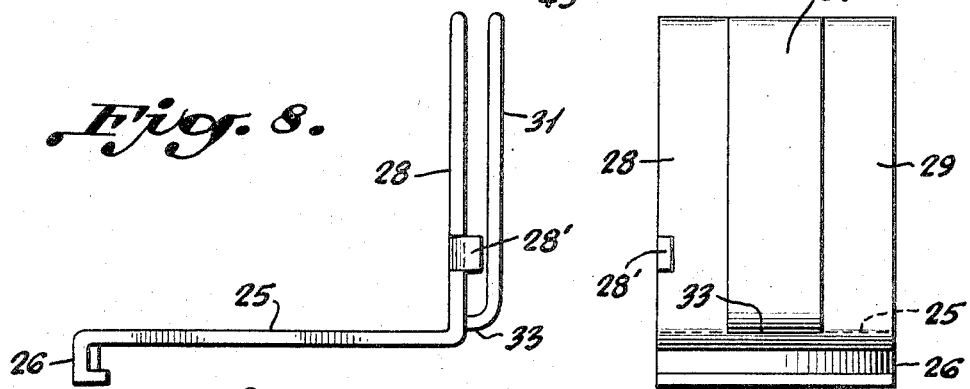
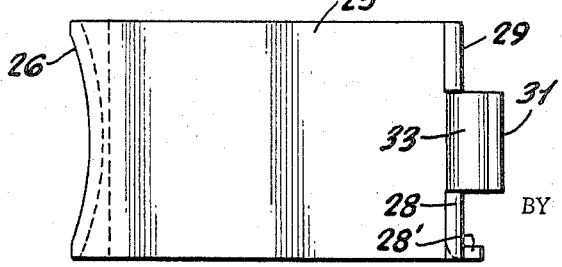

April 23, 1968 R. D. FOX 3,379,088
VISUAL NOTE INDICATOR FOR STRINGED INSTRUMENTS
Filed Aug. 19, 1965 4 Sheets-Sheet 3

INVENTOR
RIPLEY D. FOX

BY Almon S. Nelson
ATTORNEY

April 23, 1968   R. D. FOX   3,379,088
VISUAL NOTE INDICATOR FOR STRINGED INSTRUMENTS
Filed Aug. 19, 1965   4 Sheets-Sheet 4
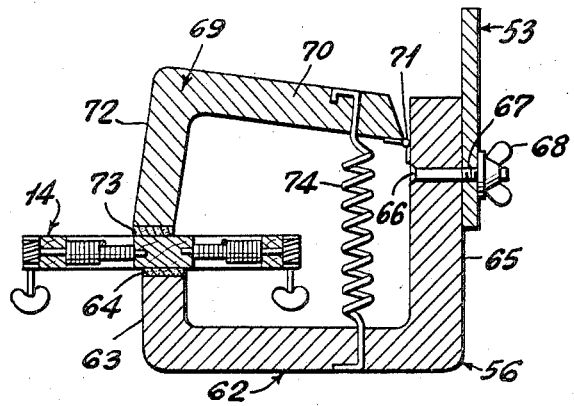
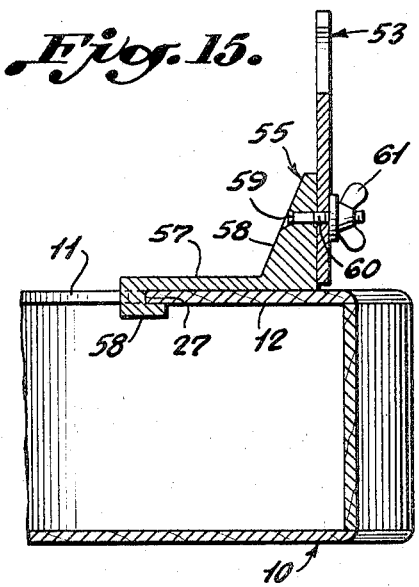
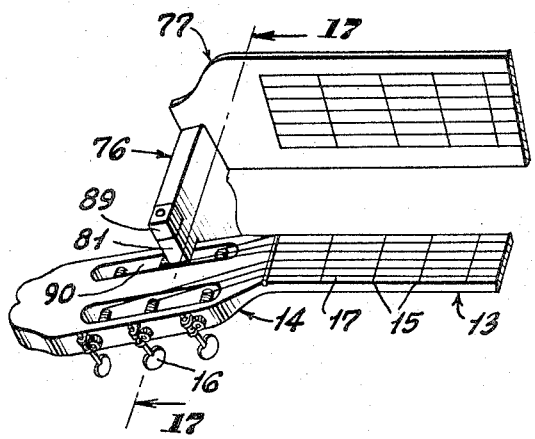
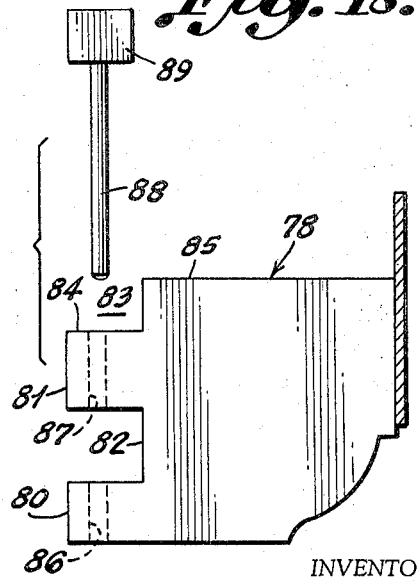
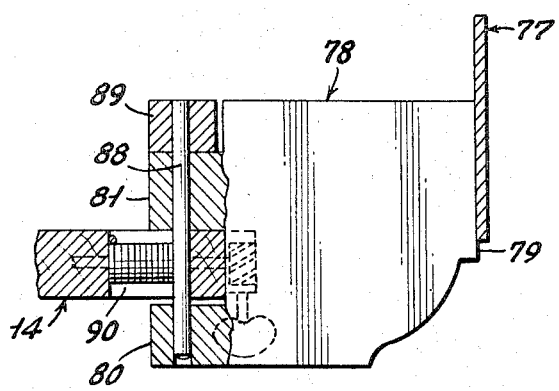
INVENTOR
RIPLEY D. FOX
BY Almon S. Nelson
ATTORNEY

United States Patent Office 3,379,088
Patented Apr. 23, 1968

3,379,088
VISUAL NOTE INDICATOR FOR
STRINGED INSTRUMENTS
Ripley Dau Fox, Pasadena, Calif.
(Le Presbytere 30, Aumessas, France)
Filed Aug. 19, 1965, Ser. No. 480,880
15 Claims. (Cl. 84—485)

This invention relates to attachments for musical instruments and more particularly to a visual note indicator for attachment to a stringed instrument such as a guitar and is intended to facilitate the playing of such an instrument.

Heretofore numerous attachments for musical instruments to facilitate the playing thereof have been proposed and utilized and while certain of these attachments have found some acceptance in musical circles and have at least to a certain extent accomplished the purpose for which they were intended, nevertheless some of these attachments have been difficult to attach and utilize and furthermore in certain cases the visibility of the charts provided by the attachments have been impaired by reason of the position of the attachment in a manner to prevent fingering of the instrument without impairing the visibility of the attachments. Furthermore, these prior art devices in certain instances prevented playing of the instrument while only providing assistance in learning positions on the keyboard, but in this case the device could not be utilized while playing a piece of music and also these devices in general provided charts translating a particular piece of music into playing positions on the keyboard but did not serve to facilitate learning of the entire keyboard and the translation of any piece of music to finger positions thereon.

Prior art devices of this nature have in general been provided for a particular size of instrument and were not adaptable to different types of instruments, for instance, guitars of different sizes. Consequently where a musician was in possession of several different sized guitar it was necessary for him to procure an attachment for each separate instrument. Likewise the methods of attachment were relatively difficult to utilize and did not provide for firmly securing the attachment in place and further, there was frequent danger of marring the finish of the instrument.

It is accordingly an object of the invention to provide a visual note indicator for a stringed instrument which may be conveniently attached to the instrument and removed therefrom without in any way modifying the instrument and furthermore without damage to the finish of such instrument.

A further object of the invention is the provision of a visual note indicator for a stringed instrument which may be conveniently attached to the instrument in a position clearly visible to the player while maintaining the instrument and the hands of the player in normal playing position.

A still further object of the invention is the provision of a visual note indicator for stringed instruments which can be conveniently adapted for attachment to instruments of different sizes without modification and without requiring the use of tools.

Another object of the invention is the provision of a visual note indicator for stringed instruments such indicator including a panel having a diagram on one face thereof simulating the frets and strings of the instrument and also bearing indicia indicating finger positions for producing certain chords or notes and with the diagram and indicia providing information for use of the entire keyboard of the instrument.

A further object of the invention is the provision of a visual note indicator for stringed instruments including a panel together with supporting means engaging the panel and the body of the instrument at the sound hole therein and with a securing member engaging the panel adjacent the opposite end and having clamp means for clamping the same to the head of the neck of the instrument.

A still further object of the invention is the provision of a visual note indicator for stringed instruments including a panel removably mounted on the instrument and charts or diagrams on opposite faces of the panel to provide information for the player of the instrument and with the panel being reversible to place either face thereof in the normal line of vision of the player utilizing the instrument.

Another object of the invention is the provision of a visual note indicator for stringed instruments which may be attached to such instruments and retained in place thereon while playing the instrument.

A further object of the invention is the provision of a visual note indicator for stringed instruments which may be conveniently and economically manufactured from readily available materials and which may be attached to or removed from the instrument without the use of tools and without requiring any particular skill.

Figure 12:
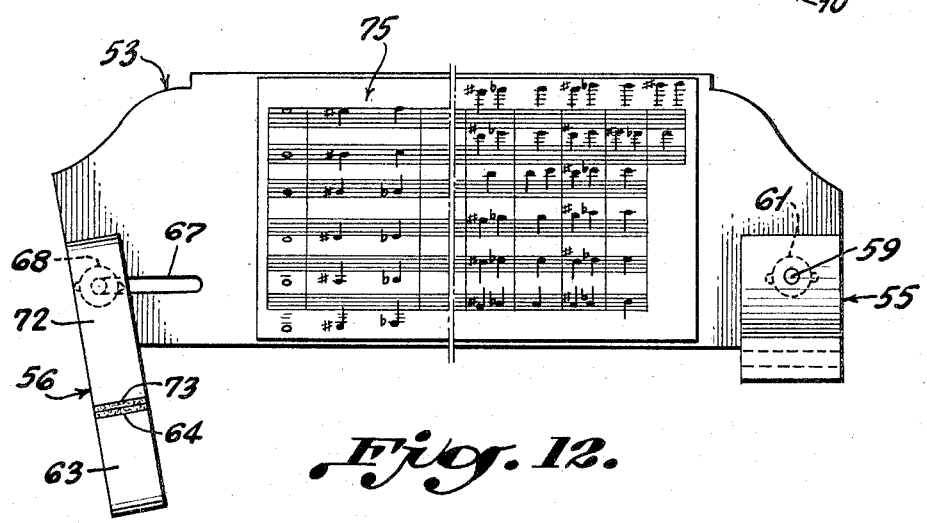
Figure 13:
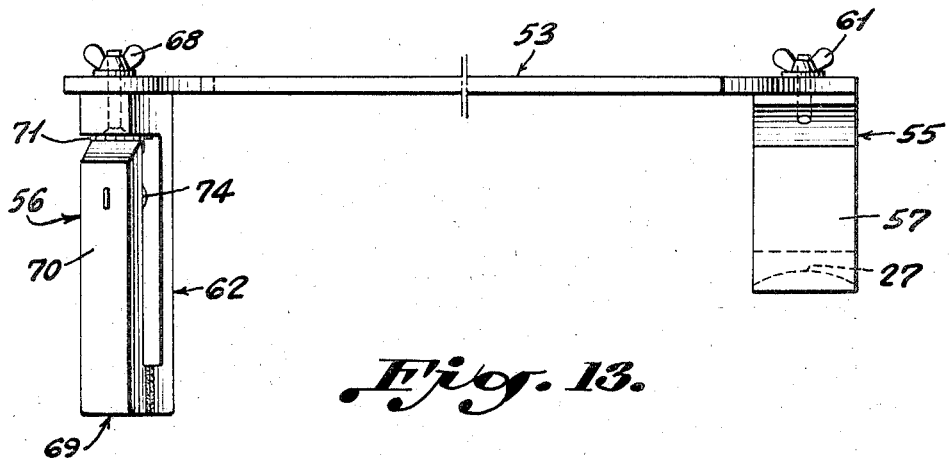

Further objects and advantages of the invention will be apparent from the following description taken in conjunction with the accompanying drawings wherein:

FIG. 1 is a view in perspective showing the visual note indicator of this invention attached to a musical instrument in the position occupied during playing of such instrument;

FIG. 2, a sectional view taken substantially on the line 2—2 of FIG. 1 and showing a detail of the securing member for securing a portion of the indicator to the head of the neck on the instrument;

FIG. 3, a sectional view taken substantially on the line 3—3 of FIG. 2 and showing further details of the securing member;

FIG. 4, a fragmentary sectional view taken substantially on the line 4—4 of FIG. 1 and showing the supporting member which engages the note indicator and also the body of the instrument at the sound hole therein;

FIG. 5, an elevational view showing one part of the securing member of FIG. 2;

FIG. 6, a top plan view of the part shown in FIG. 5;

FIG. 7, an end elevational view of the part shown in FIG. 5;

FIG. 8, a side elevational view of the supporting member shown in FIG. 4;

FIG. 9, a top plan view of the supporting member shown in FIG. 8;

FIG. 10, an elevational view of the supporting member shown in FIG. 8;

FIG. 11, a view in perspective showing a modified form of the note indicator of this invention attached to a musical instrument;

FIG. 12, an elevational view to an enlarged scale showing the note indicator of FIG. 11 and particularly one form of chart which may be applied to the panel;

FIG. 13, a top plan view of the indicator shown in FIG. 12;

FIG. 14, a fragmentary sectional view taken substantially on the line 14—14 of FIG. 11, and showing a modified form of securing member;

FIG. 15, a fragmentary sectional view taken substantially on the line 15—15 of FIG. 11 and showing the supporting member utilized with this form of the invention;

FIG. 16, a fragmentary view in perspective and showing a further modified form of securing member for securing the panel of the indicator to the head on the neck of the instrument;

FIG. 17, a fragmentary sectional view taken substantially on line 17—17 of FIG. 16 and showing further details of the securing member; and FIG. 18, an elevational view showing still further details of the securing member of FIG. 16.

With continued reference to the drawings, and particularly FIG. 1, there is shown for purposes of illustration a musical instrument in the form of a guitar which provided with a body 10 having a sound hole 11 in the upper surface 12 of the body 10 and a neck 13 projecting from the body 10 and terminating in a head 14 disposed at an angle to the neck 13. Spaced parallel frets 15 are disposed on the upper surface of the neck 13 to provide a keyboard and tuning keys 16 are provided on the head 14 from which strings 17 extend over the neck 13 and sound hole 11 to anchoring means 18 on the body 10. The above-described musical instrument is a typical guitar but obviously variations in the specific details of such instrument can be made without in any way affecting the present invention.

The visual note indicator of this invention as shown in FIG. 1 may well comprise an elongated panel 19 having a diagram 20 on one face thereof which simulates the frets 15 and strings 17 of the musical instrument. Indicia in the form of dots or other means 21 may be provided on the panel 19 and such indicia serves to indicate finger positions for producing certain chords or notes when the string and strings are depressed at the fret or frets indicated.

Means is provided to facilitate detachably mounting the panel 19 on the instrument in spaced parallel relation to the neck 13 in a manner to permit insertion and movement of the player's hand through the space 22 between the panel 19 and the neck 13 and the surface of the panel 19 bearing the diagram 20 extending upwardly at an angle to the upper surface of the neck 13 and facing the player in a manner to be clearly visible when holding and playing the instrument in normal positions.

The means for mounting the panel 19 on the instrument may well include a supporting member 23 engaging the panel 19 adjacent one end and engaging the body 10 of the instrument at the sound hole 11 in the upper surface 12 thereof and a securing member 24 engaging the panel 19 adjacent the opposite end and including means to removably fix the securing member 24 to the head 14 of the instrument.

With particular reference to FIGS. 4, 8, 9 and 10, the supporting member 23 may well comprise a base 25 in the form of an elongated flat strip of material for engaging the upper surface 12 of the body 10 and the base 25 may be provided at one end thereof with a hook 26 for extending into and engaging over the edge 27 of the sound hole 11. The opposite end of the base 25 from the hook 26 is provided with a pair of transversely spaced upstanding fingers 28 and 29 for engaging the front face 30 of the panel 19 and a single upstanding finger 31 on the base 25 is disposed between the fingers 28 and 29 and is longitudinally spaced rearwardly therefrom to engage the rear face 32 of the panel 19. The finger 31 is also provided with a portion 33 for engaging the lower edge 34 of the panel 19 to support the same and the fingers 28 and 29 together with finger 31 serve to frictionally engage the panel 19 and releasably but securely hold the same in position. The finger 28 is provided with a stop lug 28' to engage the end of panel 19 to provide accurate longitudinal positioning of the same.

With particular reference to FIGS. 2, 3, 5, 6 and 7 the securing member 24 may well comprise an elongated generally rectangular flat base 35 having a yieldable pad 36 thereon for engaging the lower surface of the head 14 of the instrument and the base 35 is provided at one end thereof with an upstanding portion 37 disposed at substantially right angles to the base 35. An elongated screw-threaded member 38 is fixed to the base 35 and extends upwardly in spaced parallel relation to the upstanding portion 37. An elongated generally rectangular flat clamping jaw 39 is provided with a yieldable pad 40 for engaging at the upper surface of the head 14 of the instrument and the jaw 39 terminates at the end adjacent the upstanding portion 37 in a reversely bent portion having a leg 41 spaced from the jaw 39. The screw-threaded member 38 extends upwardly through an aperture 43 in the jaw 39 and an aperture 44 in the leg 41 to slidably mount the jaw 39 for vertical movement. The upstanding portion 37 on the base 35 is provided with spaced vertical side flanges 45 and 46 disposed on opposite sides of the reversely bent portion of the jaw 39 to prevent rotation thereof about the screw-threaded member 38.

A compression spring 47 is received on the screw-threaded member 38 above the leg 41 and in engagement therewith and a nut 48 threadedly received on the upper end of the screw-threaded member 38 serves to adjustably retain the compression spring 47 in position.

The securing member 24 thus in reality comprises a spring clamp in which the clamping jaw 39 may be moved upwardly against the action of compression spring 37 to permit positioning of the securing member 24 over the head 14 of the instrument and upon placing the same in proper position the clamping jaw 39 may be released and is urged into clamping engagement with the head 14 by means of the compression spring 47. In this manner the securing member 24 is removably secured to the head 14 of the instrument without requiring modification thereof and without in any way damaging the finish of the instrument.

The upstanding portion 37 on the base 35 of the securing member 24 terminates in a pair of transversely spaced upstanding fingers 49 and 50 for engaging the front face 30 of the panel 19 and a single upstanding finger 51 is disposed between the pair of fingers 49 and 50 and is longitudinally spaced rearwardly therefrom as clearly shown in the drawings. The finger 51 is provided with a portion 52 adjacent the upstanding portion 37 for engaging the lower edge 34 of the panel 19 and as clearly shown in FIGS. 2 and 3, the panel 19 is received between the pair of fingers 49 and 50 and the finger 51 to releasably hold the panel 19 in place by frictional engagement therewith.

Since the engagement of the supporting member 23 and the securing member 24 with the panel 19 is only by means of friction, obviously the position of the supporting member 23 and the securing member 24 may be varied with respect to the panel 19 in order to accommodate panels of different lengths and also in order to compensate for different angular positions of the head 14 on the musical instrument.

While the panel 19 has been shown as having a diagram and finger position indicators or indicia on only one face thereof, obviously a different diagram may be provided on the opposite face and the panel 19 reversed for use of either diagrams thus materially increasing the utility of the device.

With particular reference to FIG. 11 there is shown a musical instrument the same as that shown in FIG. 1, but with a modified form of note indicator attached thereto. In this form of the invention the note indicator may comprise an elongated generally rectangular flat panel 53 having a diagram 54 on the face thereof simulating the frets and strings of the musical instrument. Secured to one end of the panel 53 is a supporting member 55 for engaging the body 10 of the instrument at the sound hole 11 and secured to the opposite end of the panel 53 is a securing member 56 for releasably clamping the panel 53 to the head 14 of the instrument.

The supporting member 55 is shown in detail in FIG. 15 and comprises an elongated generally rectangular flat base 57 for engaging the upper surface 12 of the body 10 of the instrument and terminating at one end in a hook 58 for extending into and engaging over the edge 27 of the sound hole 11 The opposite end of the base 57 is provided with an upstanding lug 58 to which is attached screw-threaded means 59 for extending through an aperture 60 in the panel 53 and a wing nut or other suitable threaded means 61 may be threadedly received on the screw-threaded means 59 for securing clamping the panel 53 to the leg 58 on the base 57. In this manner one end of the panel 53 will be securely supported on the body 10 of the instrument.

With particular reference to FIG. 14, there is shown the details of the securing member 56 which may well comprise a generally U-shaped base 62, one leg 63 of which is relatively short and terminates in a flat upper end having a pad 64 thereon for engaging the lower surface of the head 14 of the instrument. The other leg 65 of the base 62 is longer than the first leg 63 and screw-threaded means 66 mounted on the leg 65 serves to extend through a slot 67 in the panel 53 and threadedly receive a wing nut 68 or other suitable screw-threaded means for securely clamping the panel 53 to the leg 65 of the base 62. A generally L-shaped clamping jaw 69 is provided with a leg 70 hingedly mounted at 71 on the leg 65 of the base 62 and the other leg 72 of the jaw 69 terminates in a flat surface having a pad 73 thereon disposed substantially opposite the pad 64 and serving to engage the upper surface of the head 14 of the instrument. A tension spring 74 extends between the leg 70 of the clamping jaw 69 and the base 62 and such spring 74 serves to urge the pad 73 and the pad 64 into tight clamping engagement with the head 14 of the instrument thereby fixing the securing member 56 in place thereon without requiring any modification of the head 14 or in any way damaging the finish thereof.

As shown in FIG. 12 the dots or other indicia 21 of FIG. 1 may be replaced by a chart 75 incorporating conventional bars of music and musical notes. This serves to indicate the notes resulting from depression of the indicated string at the indicated frets on the keyboard of the instrument.

It is further to be noted that both the indicia shown on the panel 19 of FIG. 1 and that shown on the panel 53 of FIG. 12 differ from the conventional fingering charts provided on sheet music in that with this invention the charts or indicia are provided in a position corresponding to the keyboard of the instrument when in playing position and are disposed opposite the positions on such keyboard thereby materally facilitating the visibility and the use of the device.

With particular reference to FIGS. 16, 17 and 18 there is shown a further modified form of securing member and in this form of the invention a securing member 76 is fixed to a panel 77 which may be of the type described above in connection with FIGS. 1 and 11, and as shown the securing member 76 may well comprise a flat generally rectangular base 78 with the panel 77 secured to the rear edge 79 of the base 78 in any suitable manner. Vertically spaced ears 80 and 81 are provided on the front edge 82 of the base 78 and there is also provided a rectangular recess 83 between the upper surface 84 of the upper ear 81 and the upper edge 85 of the base 78. The ears 80 and 81 are provided with vertically aligned apertures 86 and 87 which serve to removably receive a pin 88 having a rectangular head 89 thereon which is received in recess 83 when the pin 88 is in position. As shown in FIGS. 16 and 17 the head 14 of the instrument is received between the ears 80 and 81 and the pin 88 passes downwardly through a slot 90 normally present in the head 14 to fix the securing member 56 and panel 77 attached thereto in place on the instrument.

It will be seen that by the above-described invention there has been provided a relatively simple yet highly effective visual note indicator which may be conveniently attached to or removed from a musical instrument such as a guitar, and which will serve to facilitate the playing of such instrument.

It will be obvious to those skilled in the art that various changes may be made in the invention without departing from the spirit and the scope thereof and therefore the invention is not limited by that which is shown in the drawings and described in the specification but only as indicated in the appended claims.

What is claimed is:

1. A visual note indicator for a stringed instrument having a body, a sound hole in the upper surface of said body, a neck projecting from said body and terminating in a head disposed at an angle to said neck, spaced parallel frets on said neck providing a keyboard, tuning keys on said head, and strings extending from said keys over said neck and sound hole to anchoring means on said body, said indicator comprising an elongated panel, a diagram on one face of said panel simulating the frets and strings of said instrument, indicia on said panel indicating finger positions for producing certain chords or notes, and means for mounting said panel on said instrument in spaced parallel relation to said neck to permit insertion and movement of the players' hand between said panel and said neck, the surface of said panel bearing said diagram extending upwardly at an angle to the upper surface of said neck and facing the player, said mounting means including a supporting member engaging said panel at one end and engaging the body of said instrument at said sound hole, and a securing member engaging said panel at the opposite end and including means to removably fix said securing member to the head of said instrument.

2. A visual note indicator as defined in claim 1 in which said panel is reversible and is provided with a diagram on each face and with different indicia on each diagram.

3. A visual note indicator as defined in claim 1 in which said supporting member comprises a base for engaging the upper surface of said body, a hook on one end of said base for extending into and engaging over the edge of said sound hole, a pair of transversely spaced upstanding fingers on the opposite end of said base for engaging the front face of said panel, and a single upstanding finger disposed between said pair of fingers and longitudinally spaced rearwardly therefrom, said single finger having a portion for engaging the lower edge of said panel and a portion for engaging the rear face of said panel to releasably hold said panel by frictional engagement therewith.

4. A visual note indicator as defined in claim 1 in which said securing member comprises a base having a flat surface for engaging the lower surface of said head, an upstanding portion on one end of said base disposed at substantially right angles thereto, a screw-threaded member fixed to said base and extending upwardly in spaced parallel relation to said upstanding portion, a clamping jaw slidably received on said screw-threaded member, said jaw having a flat surface for engaging the upper surface of said head opposite said base, a compression spring received on said screw-threaded member above said jaw, a nut on said screw-threaded member for adjustably retaining said spring in position, said spring together with said jaw and base serving to removably fix said securing member to said head, said upstanding portion including a pair of transversely spaced upstanding fingers for engaging the front face of the said panel, and a single upstanding finger disposed between said pair of fingers and longitudinally spaced rearwardly therefrom, said single finger having a portion for engaging the lower edge of said panel and a portion for engaging the rear face of said panel to releasably hold said panel by frictional engagement therewith.

5. A visual note indicator as defined in claim 4 in which the flat surface of said base and the flat surface of said jaw are covered with a layer of yieldable material to prevent damage to the finish of said head.

6. A visual note indicator as defined in claim 1 in which said securing member comprises a base having a flat surface for engaging the lower surface of said head, an upstanding portion on one end of said base disposed at substantially right angles thereto, an elongated member fixed to said base and extending upwardly in spaced parallel relation to said upstanding portion, a clamping jaw slidably received on said elongated member, said jaw having a flat surface for engaging the upper surface of said head opposite said base, a compression spring received on said elongated member above said jaw, means for retaining said spring in position, said spring together with said jaw and base serving to removably fix said securing member to said head, said upstanding portion including a pair of transversely spaced upstanding fingers for engaging the front face of said panel, and a single upstanding finger disposed between said pair of fingers and longitudinally spaced rearwardly therefrom, said single finger having a portion for engaging the lower edge of said panel and a portion for engaging the rear face of said panel to releasably hold said panel by frictional engagement therewith.

7. A visual note indicator as defined in claim 1 in which said securing member comprises a base having a flat surface for engaging the lower surface of said head, an upstanding portion on one end of said base disposed at substantially the right angle thereto, an elongated member fixed to said base and extending upwardly in spaced parallel relation to said upstanding portion, a clamping jaw slidably received on said elongated member, said jaw having a flat surface for engaging the upper surface of said head opposite said base, a compression spring received on said elongated member above said jaw, means for retaining said spring in position, said spring together with said jaw and base serving to removably fix said securing member to said head, said upstanding portion including means for releasably securing said panel thereto.

8. A visual note indicator as defined in claim 1 in which said supporting member comprises a base for engaging the upper surface of said body, a hook on one end of said base for extending into and engaging over the edge of said sound hole, an upstanding lug on the opposite end of said base, and screw-threaded means mounted on said lug for extending through said panel and securing the same thereto.

9. A visual note indicator as defined in claim 1 in which said supporting member comprises a base for engaging the upper surface of said body, a hook on one end of said base for extending into and engaging over the edge of said sound hole, an upstanding lug on the opposite end of said base, and means for securing said panel to said lug.

10. A visual note indicator as defined in claim 1 in which said securing member comprises a generally U-shaped base, one leg of said base being relatively short and having a flat end surface for engaging the lower surface of said head, the other leg of said base being longer than said first leg, screw-threaded means on said other leg for extending through said panel to secure the same thereto, a generally L-shaped clamping jaw, one leg of said jaw being hingedly mounted on said other leg of said base, the other leg of said jaw terminating in a flat surface for engaging the upper surface of said head, and a tension spring connecting said jaw and said base to removably fix said securing member on said head.

11. A visual note indicator as defined in claim 10 in which said panel is provided with a slot for receiving said screw-threaded means to provide means for adjusting said securing member with respect to said head.

12. A visual note indicator as defined in claim 10 in which the flat end surface on said one leg of said base and the flat end surface on said other leg of said jaw are covered with a layer of yieldable material to prevent damage to the finish of the said head.

13. A visual note indicator as defined in claim 1 in which said securing member comprises a generally U-shaped base, one leg of said base being relatively short and having a flat end surface for engaging the lower surface of said head, the other leg of said base being longer than said first leg, means on said other leg to secure said panel thereto, a generally L-shaped clamping jaw, one leg of said jaw being hingedly mounted on said other leg of said base, the other leg of said jaw terminating in a flat surface for engaging the upper surface of said head, and a tension spring connecting said jaw and said base to removably fix said securing member on said head.

14. A visual note indicator as defined in claim 1 in which said securing member comprises a flat generally rectangular base, said panel being secured to the rear edge of said base, vertically spaced ears on the front edge of said base, said base having a rectangular recess between the upper surface of the upper ear and the upper edge of said base, said ears having vertically aligned apertures, a pin removably received in said apertures, and a rectangular head on said pin received in said recess, whereby said head received between said ears and with said pin extending through an opening in said head, said securing member will be fixed to said head.

15. A visual note indicator as defined in claim 1 in which said securing member comprises a flat generally rectangular base, said panel being secured to said base, vertically spaced ears on the front edge of said base, said ears having vertically aligned apertures, and a pin removably received in said apertures, whereby with said head received between said ears and with said pin extending through an opening in said head, said securing member will be fixed to said head.

References Cited
UNITED STATES PATENTS 3,153,970   10/1964   Mulchi _____ 84—485

RICHARD B. WILKINSON, *Primary Examiner.*

G. M. POLUMBUS, *Assistant Examiner.*